United States Patent

Knapp et al.

[11] 4,161,961
[45] Jul. 24, 1979

[54] DIAPHRAGM VALVE

[75] Inventors: Heinrich Knapp, Leonberg; Max Greiner, Gerlingen; Klaus-Jürgen Peters, Affalterbach; Günther Jäggle, Stuttgart, all of Fed. Rep. of Germany

[73] Assignee: Robert Bosch GmbH, Stuttgart, Fed. Rep. of Germany

[21] Appl. No.: 831,831

[22] Filed: Sep. 9, 1977

[30] Foreign Application Priority Data

Oct. 28, 1976 [DE] Fed. Rep. of Germany ....... 2648955

[51] Int. Cl.² .............................................. G05D 7/01
[52] U.S. Cl. ............................ 137/501; 123/139 AW
[58] Field of Search ............... 123/139 AW; 137/501, 137/859

[56] References Cited

U.S. PATENT DOCUMENTS 3,508,576  4/1970  Gross .................................... 137/859
3,999,528  12/1976 Knapp et al. ................. 123/139 AW Primary Examiner—Robert G. Nilson
Attorney, Agent, or Firm—Edwin E. Greigg

[57] ABSTRACT

A diaphragm valve which may serve as an equal pressure valve or as a pressure equalizing valve of a fuel metering and distributing unit for an externally ignited internal combustion engine. The valve has a flexible diaphragm having a clamped diameter and a pocket in the diaphragm supports a valve plate. The valve plate operatively cooperates with a valve seat of the valve and has an annular recess arranged to receive a spring to center the valve plate. The valve also includes a stationary thrust plate which is concentrically disposed relative to the valve seat, which defines a knife-shaped edge which lies in a common plane with the valve seat and which operatively cooperates with the valve plate. The knife-shaped edge is penetrated by a plurality of radially extending means defining openings therein.

5 Claims, 2 Drawing Figures

DIAPHRAGM VALVE

BACKGROUND OF THE INVENTION

The present invention relates to a diaphragm valve with a valve plate which operates together with a valve seat, and with a flexible diaphragm formed as a movable valve part, which separates a housing into two chambers. A diaphragm valve with a flexible diaphragm and a valve plate firmly attached to the diaphragm, which operates together with a valve seat, is already known. In this known type of diaphragm valve the disadvantage exists, that the fastening of the valve plate to the diaphragm is expensive and unreliable, and valve plates that can move relative to the valve seat lead to malfunctions of the diaphragm valve. Furthermore, when the known valve is not in operation, the diaphragm is stretched to an undesirable degree, and when operation is again begun, an extraordinarily large pump stroke results from the diaphragm approaching the valve seat, which thus leads to an uncontrolled flow quantity of fuel being fed into the fuel injection lines.

OBJECT AND SUMMARY OF THE INVENTION

It is therefore, an object of the present invention to provide the existing state-of-the-art with an improved flexible diaphragm valve of the type discussed above.

Still another object according to this invention resides in the fact that a reliable, simple and inexpensive arrangement for disposition of the valve plate on the diaphragm is made available and thereby more improved reliability and performance of the diaphragm valve is achieved.

It is another object of the present invention to provide the existing state-of-the-art with a diaphragm valve of the type discussed above which fulfills the requirements of this type of valve and which ensures that the pressure of the pressurized liquid flowing through the system is controlled as accurately as possible in spite of the fact that a flexible membrane is employed.

A still further distinct advantage of this invention is the fact that the maximum stroke of the flexible diaphragm can be limited by a stop member located in a chamber in the housing which stop member prevents stretching of the diaphragm beyond a predetermined degree and any inordinate pump stroke by the diaphragm at the beginning of operation is thereby avoided.

Yet another object of this invention is the inclusion in the device of a stationary thrust ring concentrically disposed in said housing with respect to the valve seat and defining a knife-shaped edge which lies in a common plane with the valve seat and which operatively cooperates with the valve plate, with the knife edge also having a plurality of radially extending means defining openings therein, the arrangement being such that pendulum-like movements of the valve plate relative to the valve seat are thereby prevented.

Other objects, features and advantages of the present invention will be made apparent from the following detailed description of a preferred embodiment thereof provided with reference to the accompanying drawing.

DESCRIPTION OF THE PREFERRED EMBODIMENT

Figure 1:
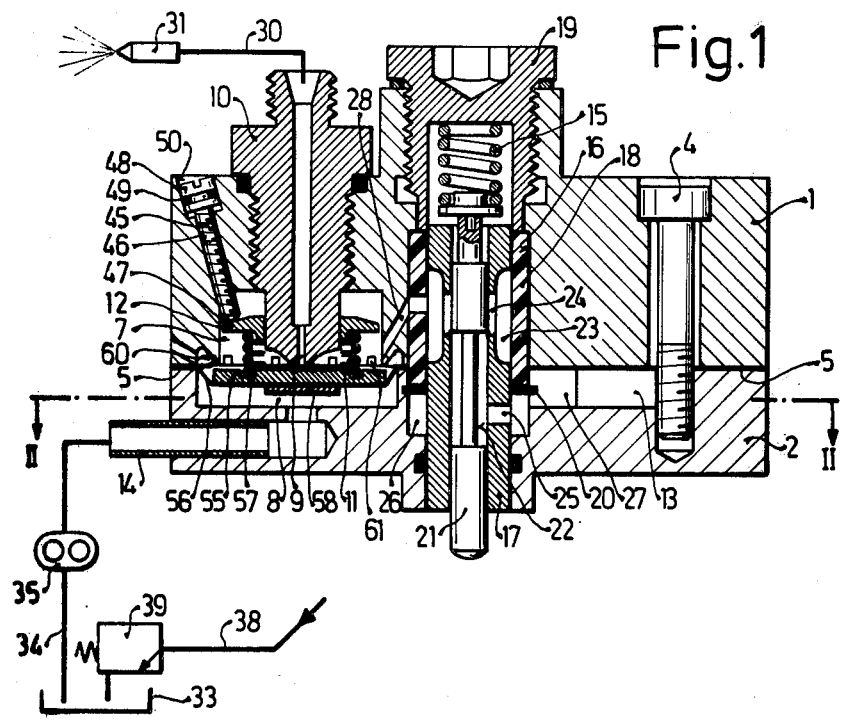
FIG. 1 is an axial sectional view of an exemplary embodiment of a fuel injection system which includes a diaphragm valve according to the present invention.
Figure 2:
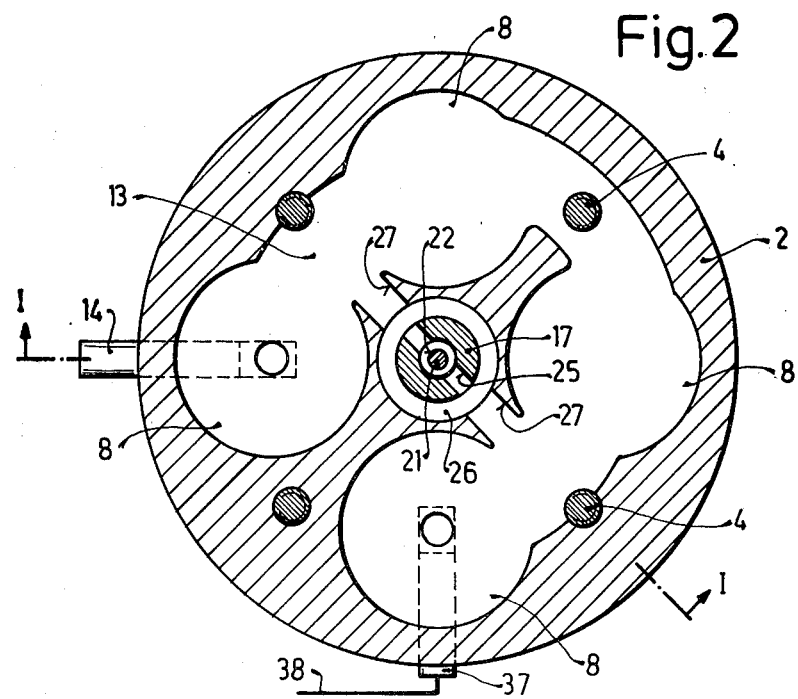
FIG. 2 is a cross-sectional view along the line II—II of FIG. 1.

Turning now to the drawing, the diaphragm valve shown in FIGS. 1 and 2 relates to a fuel metering and quantity dividing valve of a fuel injection device comprising a housing having an upper portion 1 and a lower wall 2, which are maintained in a sealed state by screws 4. A flexible diaphragm 5 is suitably stretched between the upper portion of the housing 1 and the lower portion 2 and serves as the movable valve part to divide the axial bore through the housing 1 into upper and lower chambers 7 and 8.

The flexible diaphragm 5 is made of an elastic material, for example, plastic or a plastic reinforced with webbing. The exemplary embodiment shown involves a fuel metering and quantity dividing valve for a 4-cylinder internal combustion engine. A valve carrier 10, which is suitably screwed or affixed in the upper portion of the housing 1 includes a valve seat 9 adjacent to the diaphragm and serves as the connector for the lines 30, which lead to fuel injection valves 31, of which only one is shown. A valve spring 11 is disposed about the carrier 10 in the chamber 7 and includes a lower surface that is supported on a valve plate 55 with its upper end arranged to abut against a spring plate 12, which is slidably arranged on the perimeter of the valve carrier 10 that projects into the chamber 7. Accordingly, the valve spring 11 loads the valve plate 55, which operates together with the valve seat 9, in the open direction, so that the diaphragm valve is open when not in operation, as shown in FIG. 1.

The plurality of chambers 8 (see FIG. 2) located in the lower portion of the housing 2, communicate with each other through an annular channel 13, so that the fluid current flows through these chambers consecutively. From a fuel container 33, a line 34 leads to the first of the chambers 8 through a continually supplying fuel pump 35 and a nipple 14. From the last chamber 8 through which fuel flows, a line 38 leads through a nipple 37 to a pressure maintaining valve 39 and from there back to the fuel container 33.

A bushing 17 is arranged in an axial bore 16, which penetrates both portions of the housing. This bushing is secured against shifting and turning by an elastic gasket 18, which can be made of rubber, for which purpose the gasket is axially compressed by a plug 19 against a disc 20, which is arranged in the lower portion of the housing 2.

A distributing slide valve 21, which has an annular groove 22, is arranged to be moved axially in the bushing 17 against the force of a spring 15 that is received in a blind bore in the plug 19. Instead of the spring 15 being utilized to produce the return force on the distributing slide valve 21, pressurized fluid could be used, which, when controlled by a hydraulic control pressure system not shown here, would act upon the distributing slide valve. Vertical grooves 23, located in the bushing 17, are connected with the inner bore of the bushing by means of exactly parallel similar vertical control grooves or slots 24. Depending on the position of the distributing slide valve 21, the annular groove 22 opens the control groove 24 to a variable degree. Radial bores 25 are also disposed in the bushing to provide a constant connection between the annular groove 22 and the channel 26. From the annular channel 26, radially extending channels 27 (FIG. 2) lead to the channel 13, so that the channel 26 is connected with the chamber 8 of the diaphragm valve. The vertical grooves 23 disposed in the bushing 17 are connected with the chamber 7 of the diaphragm valve through channels 28 so that each diaphragm valve has a vertical groove 23 with its communicating control slot 24. It is to be understood that the chambers 7 of these diaphragm valves are separated from each other.

In view of the foregoing, it is now understood that the plate 12 is slidable relative to the stem of valve carrier 10 and is urged upward by spring 11 against a threaded adjusting means 45. The adjusting means 45 is suitably secured in a threaded bore 46 and projects angularly into the chamber 7, this angularity aiding in meeting space requirements. The spring plate includes a chamfered surface corresponding to the angle of the adjusting screw 45 and is disposed so that nose 47 abuts thereagainst. In lieu of the adjusting means 45, a rigid rod, guided in a bore could also be used. For sealing and securing the adjusting means 45 against turning, a suitable gasket 49 can be inserted in a groove provided in the head 48 with the gasket 49 arranged to lie against the wall of the bore 50 which surrounds the head 48.

According to the invention, the valve plate 55 is arranged loosely in a preformed pocket 56 of the diaphragm, and is centered by the lower surface of the valve spring 11, which engages in an annular groove 57 provided in the valve plate 55. The valve plate 55 can also be centered relative to the valve spring by providing the upper surface with a projection that is complemental to the inner diameter of the spring 11. The depth of the preformed pocket 56 of the diaphragm corresponds closely to the thickness of the valve plate 55, so that the surface of the valve plate 55 which faces the valve seat 9, is at the level of the diaphragm when the system is operating. The maximum stroke of the flexible diaphragm 5 and accordingly of the valve plate 55, is limited by a stop 58 secured to the housing in the chamber 8.

Concentrically to the valve seats 9, support rings 60 having narrow, nearly knife-like front edges, are provided in the chambers and disposed so that the valve plate lies against both the valve seat 9 and against the front edges when the device is in the closed position. Because of technical processing reasons it is advantageous to place the knife-like front edges of the support rings 60 and the valve seat 9 at the level of the diaphragm. The diameter of the knife-like front edges of each support ring 60 is smaller than the diameter of the valve plate 55. The nearly knife-like front edges of each of the support rings 60 can also have a small radius. The support rings 60 are interrupted by radial openings, which make possible a pressure equalization in the chamber 7 when the valve plate 55 is lying against the support ring 60.

OPERATION

The method of operation of the fuel metering and volume divider valve is as follows:

The fuel flows out of the fuel container 33 through the line 34, thence through the pump 35 and into one of the chambers 8 of the diaphragm valves and thereafter travels through the channel 13 to the other chambers 8 of the further diaphragm valves until the unused portion returns to the fuel container 33 through the nipple 37, with the valve arranged to determine the pressure in the divider system. The remaining portion of the fuel flows through the channels 27, to the channel 26, and from there into the annular groove 22 of the distributing slide valve 21. The annular groove 22 opens the control slots 24 to a larger or smaller degree, through which the thus metered fuel flows into the vertical grooves 23 and from there through the channels 28 into the chambers 7 of the diaphragm valve. This stiffness of the diaphragm and the force of the valve spring 11 are chosen so that when there is a change in the intended fuel pressure between the two chambers 7 and 8 of the diaphragm valves, the flow cross section between the valve plate 55 and valve seat 9 changes and the intended pressure is once more achieved. This is accomplished in an extraordinarily short time by means of this flat seat valve, because even a small stroke of the membrane changes the current flow area to a large degree.

With the shown fuel and quantity dividing valve for a fuel injection device the maximum opening strokes for the largest flow quantities would be approximately 0.1 mm. The spring force changes only slightly because of this small stroke, so that the regulation can operate very precisely, i.e., the pressure of the fuel independent of the flowing volume is nearly constant.

In order to simplify the mounting of this type of valve, and to harmonize the individual adjustments of the individual valve or to change to another value, the adjusting member 45 is provided, by means of which the spring plate 12 can be slidably situated on the projecting section of the valve seat carrier 10 in the chamber 7, thereby making the tension of the valve spring 11 variable. The use of a flexible diaphragm, especially a plastic diaphragm reinforced with webbing, lessens the control problems with several simultaneously controlled valves because of the nearly negligible internal stiffness of the diaphragm. Furthermore, with the use of a plastic diaphragm reinforced with webbing, there is no need for a sealant or gasket and the choice of the housing material is no longer limited to certain materials because of reasons of corrosion. In order to avoid the unreliable and expensive fastening of the valve plate to the diaphragm, the diaphragm 5 according to the present invention is provided with preformed pockets 56 in the area of each valve, in which the valve plates 55 are loosely laid and by means of which the valve springs 11 are guided.

The maximum downward stroke of the diaphragm 5, and together therewith the valve plates 55, is limited by a stop 58 which is attached to the housing in each of the chambers. By means of this stop 58 an undesirable excessive stretching of the diaphragm is avoided by the valve spring 11 when the device is not operational and so is a large uncontrolled pump stroke of the diaphragm when operation is again begun.

The valve plate 55 arranged in the pocket 56 of the diaphragm 5 will lie, during the operation of the valve, against any point of the front edge of the support ring 60. This point acts as a hinge and makes possible a frictionless movement of the valve plate relative to the valve seat 9, while avoiding a pendulum movement of the diaphragm and the valve plate. In this manner, definite opening and closing movements are achievable even with elastic diaphragm valves, whereby a regulation precise enough for high demands can be achieved.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. In a diaphragm valve including: means defining a chamber; a flexible diaphragm forming a movable part of the valve, said diaphragm being clamped by the chamber defining means so as to extend across the chamber and divide same into two chambers through which pressurized liquid flows; and a valve carrier including a seat positioned in one of the chambers in operative proximity to the diaphragm, the improvement comprising:
   a valve plate disposed loosely in a pocket in the diaphragm and serving to operatively cooperate with the valve seat; and
   spring means encircling said valve carrier arranged to center said valve plate relative to said valve seat.

2. A diaphragm valve according to claim 1, in which said valve plate has a predetermined thickness and said pocket in said diaphragm is complemental to said thickness.

3. A diaphragm valve according to claim 1, in which said valve plate includes an annular groove and said spring has a perimetral portion that is received in said groove.

4. A diaphragm valve according to claim 1, in which said chamber further includes means defining a stop arranged to limit movement of said diaphragm.

5. A diaphragm valve according to claim 1, in which said diaphragm valve further includes a housing, a stationary thrust ring concentrically disposed in said housing with respect to the valve seat and defining a knife-shaped edge which lies in a common plane with the valve seat and which operatively cooperates with the valve plate, said knife-shaped edge including a plurality of radially extending means defining openings therein.

* * * * *